United States Patent [19]

Sass

[11] Patent Number: 4,878,326
[45] Date of Patent: Nov. 7, 1989

[54] LOCKING AND SEATING MEANS FOR CHIMNEY LINERS

[76] Inventor: Thomas J. Sass, 5300 Pershing Ave., Parma, Ohio 44134

[21] Appl. No.: 250,559

[22] Filed: Sep. 29, 1988

[51] Int. Cl.<sup>4</sup> ............................................. E04H 12/28
[52] U.S. Cl. ...................................... 52/218; 403/313; 403/338
[58] Field of Search .............. 52/218; 98/60; 285/373, 285/383, 419, 410; 403/313, 338

[56] References Cited

U.S. PATENT DOCUMENTS

| 1,921,346 | 8/1933 | Conroy | 52/218 |
| 2,381,178 | 8/1945 | Munyon | 52/244 |
| 3,341,232 | 9/1967 | Deakins | 285/373 |

FOREIGN PATENT DOCUMENTS 2145212  3/1985  United Kingdom .................. 52/218

Primary Examiner—David A. Scherbel
Assistant Examiner—Jerrold D. Johnson
Attorney, Agent, or Firm—J. Helen Slough

[57] ABSTRACT

This invention is a flue liner collar designed to secure liners within a masonry chimney. It further comprises a liner interlock comprised of two interconnected metallic bands of identical configuration forming an expansible and contractible collar for the sides of two stacked chimney liners and said bands having inwardly extending flanges for seating the ends of said adjacent liners.

2 Claims, 2 Drawing Sheets

LOCKING AND SEATING MEANS FOR CHIMNEY LINERS

BACKGROUND OF THE INVENTION

A conventional chimney is constructed of masonry units which may include brick, stone, or concrete block. A flue is the space or passage through which gaseous matter is vented in conjunction with fireplaces, furnaces, and boilers. It is constructed so as to eliminate fire hazards due to heat conduction and dissipation.

Most building regulations require a flue lining of some type, which is available in hollowed rectangular, square or round shapes in a vitrified finish. Clay tiles (liners) are two foot sections of burned clay, shale, fireclay, or mixtures thereof, designed to resist corrosion, softening or cracking from excessive flue gas temperatures. A flue lining within a chimney extends from approximately one foot below the flue connection to the top of the chimney. Tile-lined masonry chimneys have an air gap between the tile and brick (roughly $\frac{1}{2}''-1''$), which allows the tile thermal expansion and contraction, without stressing the chimney wall.

FIELD OF THE INVENTION

Accordingly, this invention is designed to prevent shifting of flue tile liners through the use of a preformed metallic interlocking unit, which fits over and clamps onto two stacked flue liners. Said unit can be used within fireplaces, furnace, and boiler flues of residential and/or commercial structures. Said unit can be utilized in chimney construction, repair, relining and/or extension.

DESCRIPTION OF PRIOR ART

U.S. Letters Pat. No. 2,011,018 discloses continuous flue or chimney means to secure the vertical flue and spaced outer wall together. Vertically aligned tie rods are employed to connect the same.

An extension for a chimney liner applied to a protruding portion of a liner as shown in U.S. Letters Pat. No. 2,381,178 utilizes a reinforcing rod in conjunction with a longitudinally extending slip joint to provide for expansion or contraction of the liner and fits inside and about the liner.

Protective chimney coverings have also been provided as shown in U.S. Letters Pat. No. 3,631,789. Such enclosures are directed to the use of extrusions, and consist of fireproof, metallic members snapped together to form a ventilated, protective chimney cover for surrounding a ceramic tile lining.

When the need for a simplified interlocking flue tile device is evident, which features easy application, durability, efficiency, and practicality, such a device would contribute to a structurally safe and sound chimney, and be a deterrent of internal/external deterioration.

All chimneys are not provided with liners and upon examination thereof a need for a liner to keep the chimney tight and to prevent cracking of the brick, etc., a liner must be installed for protection of the chimney. Said liners in many cases are difficult to install and cannot be readily retrofitted.

SUMMARY OF THE INVENTION

In accordance with the invention claimed, a new and improved interlocking flue tile device is provided which is simplistic in nature, purposeful, efficient, and promotes (upgrades) overall chimney safety.

It is an object of this invention to produce a durable and structurally sound chimney flue system, interlocked against disengagement and which maintains a tight binding grip between a pair of adjacent flue liners to which it is applied.

A further object of this invention is safety, wherefor sufficient bracing is provided to hold the tile components together, decreasing the likelihood of structural fracture, resulting from differential movement and shifting.

It is further an object to provide means whereby water and gaseous infiltration are deterred.

IN THE DRAWINGS

Figure 1:
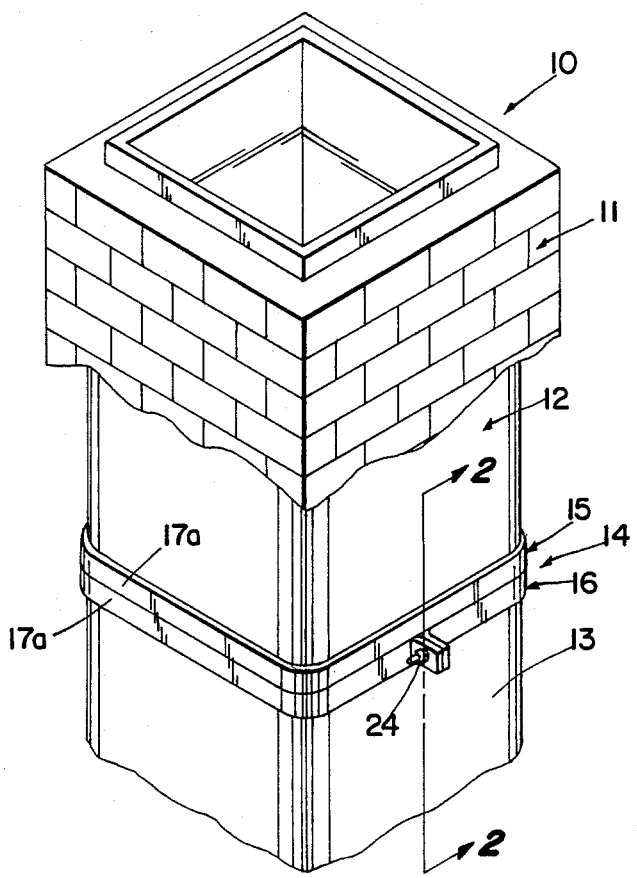
FIG. 1 is a cutaway perspective view showing the means of the invention for interlocking two flue liners within a masonry chimney.
Figure 2:
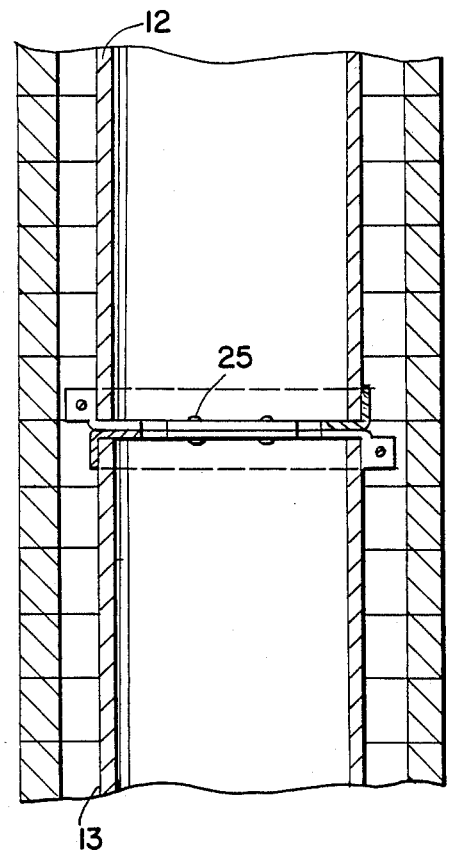
FIG. 2 is a sectional view taken on the line 2—2 of FIG. 2.
Figure 3:
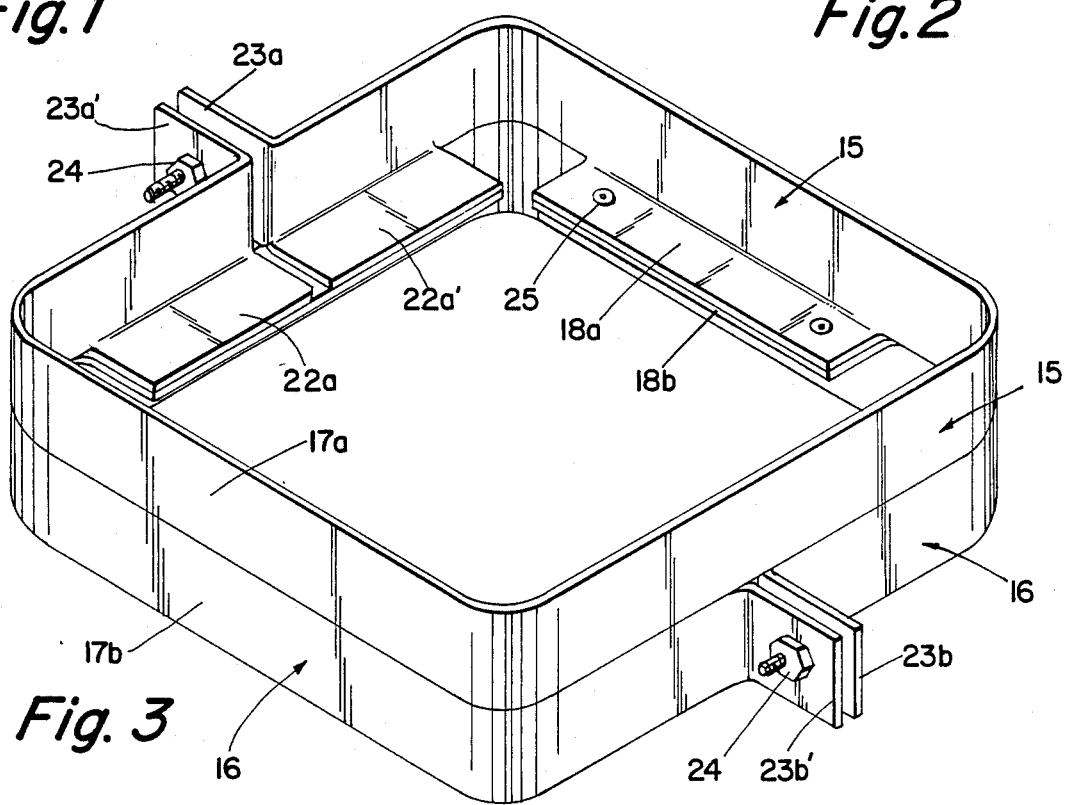
FIG. 3 is an enlarged perspective view of the locking means of this invention.

Referring now more specifically to the drawings, in all of which like parts are designated by like reference numbers, at 10 I show a portion of a chimney, at 11 the bricked exterior of the same, at 12 and 13 a pair of liners for the chimney, the liners being preferably of tile construction. At 14 I show a pair of rectangular strips or bands 15 and 16 of metal of suitable length and width to enclose the liners 12 and 13 and the bands or collars are placed in reverse mounting or as mirror images above and below each other. The collars or bands 15 and 16 have elongated sides 17a and 17b disposed substantially about the sides of the liners and each side had inwardly extending elongated flanges 18a, 18b on three of its adjacent uninterrupted sides 17a and 17b and a pair of relatively shorter inwardly extending flanges at 22a and 22a' on a fourth side thereof. Said flanges 22a and 22a' are disposed at right angles to the relatively spaced shorter sides of the bands. Outwardly extending spaced flanges 23a, 23a' and 23b, 23b' are secured together but fastening means such as nut and bolt means 24 thus providing by adjustable fastening for relative expansion or contraction of each of the bands or strips to adapt the same for securely peripherally enclosing and locking the liner it encases and seating the same. It hence provides for use on liners of slightly different sizes and for secure seating and locking of the same and interlocking of adjacent liners.

It should be noted that the expansion and contraction means preferably are provided on opposite sides of the upper and lower bands. It should further be noted that rivets 25 or the like are preferably employed to fasten the overlapping inwardly disposed flanges 18a and 18b of the two bands together. The same could further be welded together.

Collectively as shown and described the bands form seating for lower and upper surfaces of adjacent flue liners.

Figure 4:
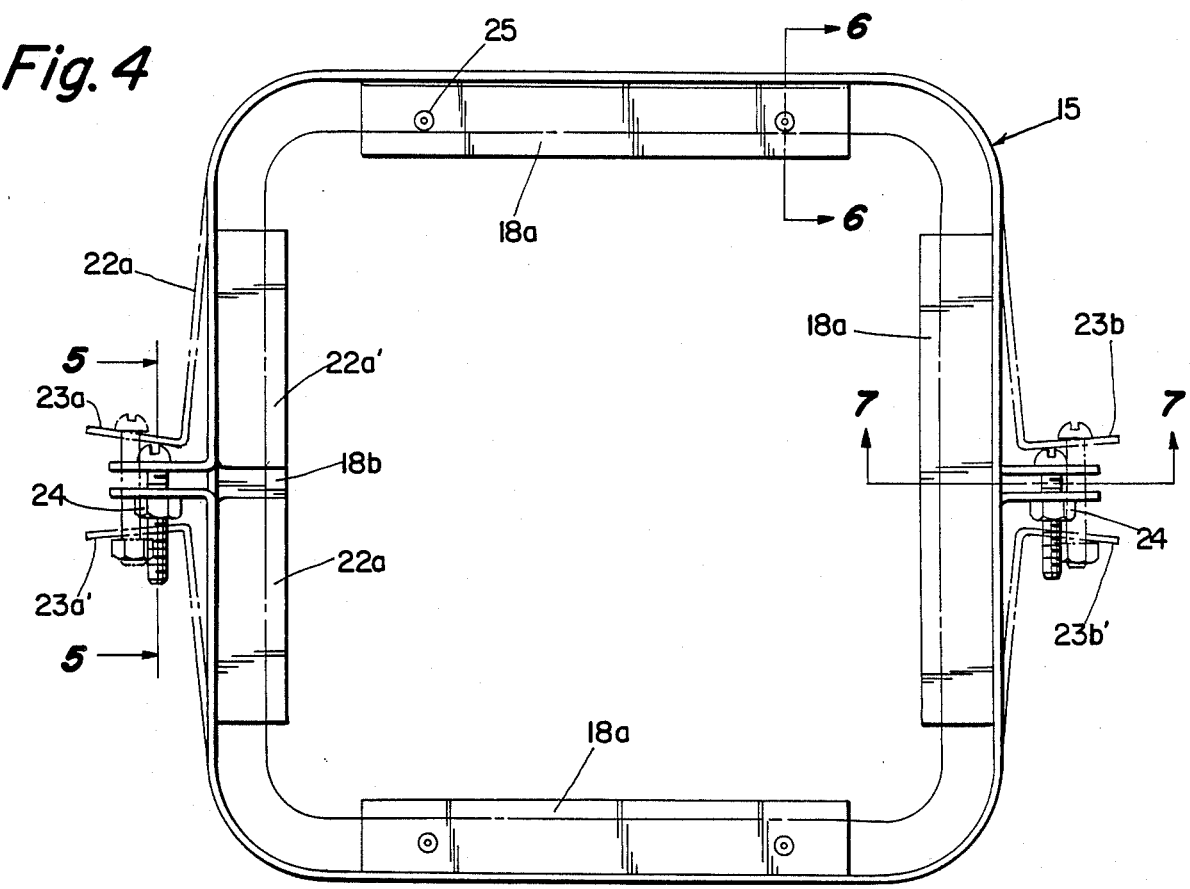
FIG. 4 is a sectional top view of the tile interlock depicting open and closed positions of the interlocking assembly.
Figure 5:
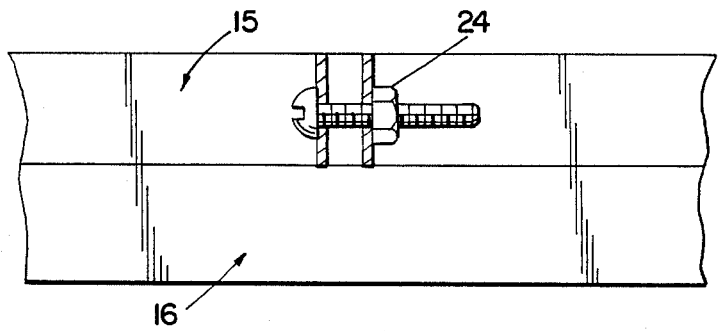
FIG. 5 is an enlarged sectional view taken on the line 5—5 of FIG. 4.
Figure 6:
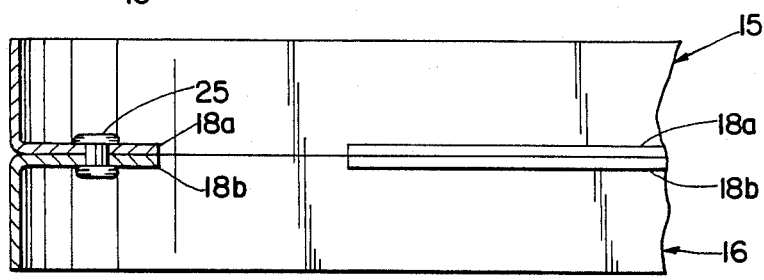
FIG. 6 is an enlarged sectional view taken on the line 6—6 of FIG. 4.
Figure 7:
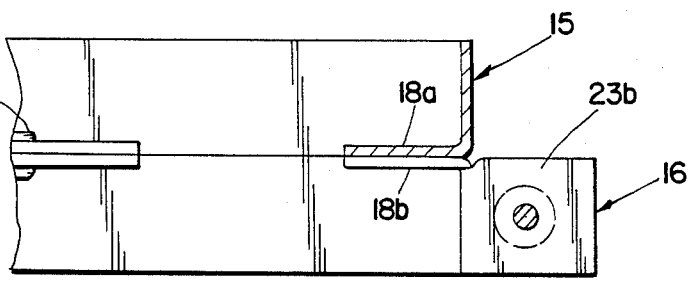
FIG. 7 is an enlarged sectional view taken on the line 707 of FIG. 4.

The liner interlock as shown is an expansible and contractible collar formed from two interconnected rectangular, square or round bands of metal of appropriate length and width, bent to form a collar-like apparatus having side walls adapted to overlap portions of the liners. The bands of metal as shown in the embodiment disclosed herein are adapted to be adjustably locked on opposite sides, one on the upper band, and one on the lower band (see FIG. 4). The bands are identical, but mirror images of each other, secured together by inwardly directed flats or tabs (rivets or spot welds) on opposite sides (see FIGS. 4 and 7).

Each metal band shown is a single piece, bent and cut to designated length and width. The interior of the collar consists of eight metal plates, equal in length and width, four of which are riveted/spot welded together into two permanent plates, and positioned opposite each other. The opposing sides consist of a permanent and a movable plate with center removed, and bent into an out-turned flange with a nut/bolt assemblage. Collectively, these plates form the inner resting supports for an adjacent flue liner.

The liner interlock is intended to have gripping engagement with pairs of adjacent stacked liners when secured thereto. Preferably furnace cement may be applied to the inner flanges of the band or collar (note that refractory cement is typically applied to flue tile joints) for further adhesion and support of the same. The bottom liner serves as the top for the next adjacent liner, and conversely, the upper liner is the bottom for a top adjacent liner.

When the liner collars are fitted about the adjacent liners and fastening means such as the bolt and nut means shown are tightened, each flanged band of the lining interlock is drawn tightly about the liner which it encases and the bands constricts the liners and the pair of metal bands securely locked are brought into tight binding engagement with adjacent liners. Thus, the liners are secured and interlocked, but still permitted necessary space for normal thermal expansion and contraction. Tile liner shifting is prevented thereby.

Although but one embodiment of this invention has been illustrated and described, it is to be understood to one skilled in the art that numerous changes may be made in the structure shown and described such as changes necessitated by the form of the liner or its contour and the fastening and seating means employed, etc., without departing however from the spirit and scope of the claimed invention.

What I claim is:

1. A band for joining adjacent stacked liners of a chimney, said band forming a collar about the outer wall of a first liner, said band having a plurality of inwardly extending flanges at substantially right angles to the collar and abutting portions of an end surface of said liner, said band having means interlocking said band with a second band of similar form disposed about a second liner positioned in stacked end to end relation to said first liner, at least one of said inwardly extending flanges acting as said interlocking means.

2. A band for joining adjacent stacked liners of a chimney as claimed in claim 1 having fastening means for interlocking the inwardly extending flanges.

* * * * *